March 5, 1957 M. K. ANKLESARIA 2,784,261

TELEPHONE HAND SET SUPPORT

Filed June 1, 1953

INVENTOR.

Maneck K. Anklesaria

BY

Robt. W. Pearson

ATTORNEY.

United States Patent Office 2,784,261

Patented Mar. 5, 1957

2,784,261

TELEPHONE HAND SET SUPPORT

Maneck K. Anklesaria, Los Angeles, Calif.

Application June 1, 1953, Serial No. 358,754

1 Claim. (Cl. 179—148)

This invention relates to a telephone handset support.

More specifically, the present invention pertains to a device for adjustably supporting a telephone handset while in use, thus leaving both hands of the operator while telephoning free to be used as desired.

An important object of the invention is to provide, in a telephone handset support, a superior means for supporting the handset in a great variety of positions so that the receiving and transmitting end portions of the handset will be properly and accurately positioned in relation respectively to the ear and mouth of the user.

Another object is to provide for the device an improved basal structure, particularly well adapted for having mounted upon it an upwardly directed standard which adjustably supports the handset while the latter is in use.

It is also a more specific object of the invention to provide, in conjunction with a basal support therefor, an improved standard so constructed that it contributes toward a wider range of adjustment of the handset while the latter is in use.

Other objects, advantages and features of invention will hereinafter appear.

Referring to the accompanying drawing, which illustrates a preferred, reduced to practice embodiment of the invention, Fig. 1 is a side elevation of the complete device (except that some parts are sectioned), showing the same in use, the handset being fragmentarily shown in use the broken lines in the upper right hand portion of the view and the normal position of the handset, together with its supporting base, being indicated by broken lines in the lower part of the view, also, in the upper part of the view, broken lines indicate an upward adjustment of parts of the device adjacent to the supported handset.

Figures 1, 2, 3, 4:
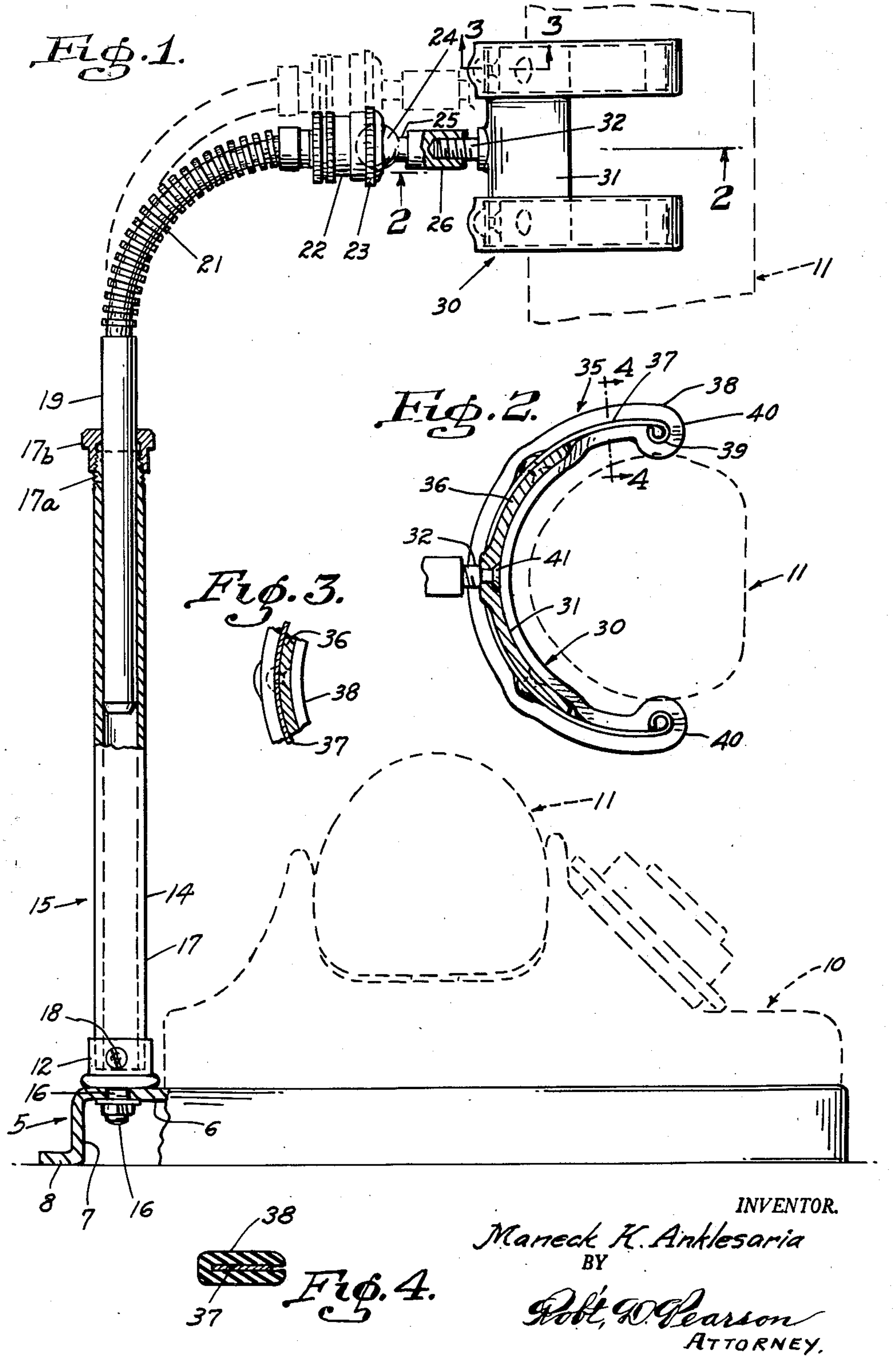
Fig. 2 is a sectional detail looking up from line 2—2 of Fig. 1.
Fig. 3 is a section on line 3—3 of Fig. 1.
Fig. 4 is a section on line 4—4 of Fig. 3.

Referring in detail to the drawing, the device is shown comprising a base 5 made of a rigid sheet material and of an inverted dish shape, having an upwardly directed bottom 6, a peripheral side wall 7 and an outwardly directed, horizontal foot flange 8.

The aforesaid basal member 6 is dimensioned to underlie and support the telephone handset base 10, shown in broken lines in the lower part of Fig. 1 together with a handset 11, said base 5 being broad enough to provide room for supporting alongside said handset base a cup shaped mounting member 12 for the lower tubular section 14 of a standard 15. Said member 12 is provided integrally with a central, threaded pin 16 which projects downwardly through an aperture in the bottom wall 6 of the base 5, a nut and washer being applied to said pin below said wall 6 to secure the cup in place.

The aforesaid standard portion 17 has its lower end portion closely fitted within said cup 12 and secured therein by a setscrew 18. The upper end portion of said tubular part 17 has adjustably telescoped into it a rod 19, the upper portion of said tubular section 17 being longitudinally slit at 17*a* and a clamping nut 17*b* causes said rod 19 to be gripped with sufficient friction to remain in adjusted longitudinal and rotational positions. There is axially secured to the upper end of said rod a shaft 21 which is manually bendable, but is sufficiently stiff to maintain itself in the adjusted position. Said shaft 21 has axially secured to its upper end a recessed cylindrical head 22 which, in combination with a ring or apertured cap 23 secured onto it, forms one part of a two-part universal joint; the other part of said joint comprising the ball 24, ball shank 25 and adapter 26. The handset is thus mediatedly supported from the lower standard section 17.

When the handset 11 is supported by the device the handset handle 11*a* is gripped by a double yoke 30 having a crossbar or body portion 31 from the midlength portion of which projects a threaded pin 32 which screws into a socket provided for it in the aforesaid adapter 26. Each end portion of said yoke body 31 has secured to it a pair of co-operating arcuate resilient arms 35, each of said pairs of arms forming a U-shaped member and comprising an inner rigid portion 36, an arcuate leaf spring 37 and an outer elastic sheath 38, said spring having curled outer end portions 39 which project beyond the ends of said rigid part 36, and serve to provide the yoke arms with terminal enlargements 40 which adapt them securely to grip the end portions of the handset handle 11*a*. The aforesaid pin 32 is desirably secured to the yoke body 31, as indicated at 41 in Fig. 2, by peening over its diametrically reduced end portion.

To prepare the device for use in the most advantageous manner it is only necessary to place its basal portion 5 in an underlying relation to the handset base 10, so that the weight of the handset base will stabilize the device while it is supporting the handset proper in the most convenient position for use during telephoning without being held by a hand of the user.

It will be observed that the universal joint at the upper end of the standard, in combination with the rod 19 being turnable and with the manually bendable character of the upper part 21 of the standard, affords a wide and diversified range of adjustment for the supported telephone handset, providing not only for tilting it in all directions, but also for adjusting it horizontally and supporting it at the desired height, and at the same time being turnable at the telescoping section to the desired radial direction by the user.

The resilient, arcuate yoke arms with the rounded, enlarged end portions 39 will be so constructed that their said end portions will tend to maintain themselves spaced apart a slightly less distance than the diameter of the handset handle 11*a*, so that the latter may readily be forced between them, thus to be supported in a secure, but readily detachable manner.

The arcuate rigid body part 36 extends from end to end of the yoke structure and the concave sides of the midlength portions of the leaf springs 37 engage said end portions and are riveted to them. Said spring arms support in the proper manner the already described elastic sheaths in which they are encased.

I claim:

A basal member adapted to underlie and support a telephone handset base; a sectional standard secured to a side portion of said base, said standard comprising a tubular rigid lower end portion, a rigid rod frictionally contained within said tubular standard portion and adjustable to project more or less thereabove, a stem forming an upward continuation of said rod, said stem being sufficiently flexible for manual deflection; a two-part universal joint structure one part of which is secured to the upper end of said stem; a member secured to the other part of said universal joint structure; means to detachably connect the latter member with a telephone handset, the parts of said universal joint structure frictionally maintaining themselves in adjusted positions, and said manually deflectable stem being sufficiently stiff to maintain itself in adjusted positions, said basal member being shaped as an inverted dish with an upwardly directed bottom to support the base of the handset, a cup shaped member seated upon a side portion of said basal member and carrying a pin projecting downwardly through an aperture in said bottom, and a securing nut screwed onto the lower end portion of said pin below said bottom.

References Cited in the file of this patent

UNITED STATES PATENTS

| | | |
|---|---|---|
| 1,306,445 | Standish | June 10, 1919 |
| 2,048,865 | Hufschmid | July 28, 1936 |
| 2,481,271 | Willey | Sept. 6, 1949 |
| 2,521,043 | Citso | Sept. 5, 1950 |
| 2,595,054 | Chesick | Apr. 29, 1952 |
| 2,597,670 | Pinto | May 20, 1952 |
| 2,621,262 | Hoagland | Dec. 9, 1952 |